United States Patent
Bagaria et al.

(10) Patent No.: US 12,231,442 B2
(45) Date of Patent: Feb. 18, 2025

(54) CLIENT-SERVER SESSION BASED ANOMALOUS BEHAVIOR DETECTION

(71) Applicant: Citrix Systems, Inc., Fort Lauderdale, FL (US)

(72) Inventors: Priya Bagaria, Kolkata (IN); Kasirao Velugu, Bengaluru (IN); Thirumoorthi Thangamani, Pallipalayam (IN); Ganesh Kathiresan, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 769 days.

(21) Appl. No.: 17/319,326

(22) Filed: May 13, 2021

(65) Prior Publication Data
US 2022/0368700 A1    Nov. 17, 2022

(51) Int. Cl.
| | |
|---|---|
| H04L 29/06 | (2006.01) |
| G06N 5/04 | (2023.01) |
| G06N 20/00 | (2019.01) |
| H04L 9/40 | (2022.01) |

(52) U.S. Cl.
CPC .......... *H04L 63/1416* (2013.01); *G06N 5/04* (2013.01); *G06N 20/00* (2019.01)

(58) Field of Classification Search
CPC ....... H04L 63/1416; G06N 20/00; G06N 5/04
See application file for complete search history.

(56) References Cited

U.S. PATENT DOCUMENTS

| | | | |
|---|---|---|---|
| 2006/0277596 A1* | 12/2006 | Calvert | H04L 63/0218 726/3 |
| 2018/0027004 A1* | 1/2018 | Huang | H04L 43/04 726/23 |
| 2020/0106806 A1* | 4/2020 | Gupta | H04L 61/4511 |

* cited by examiner

*Primary Examiner* — Jeffrey C Pwu
*Assistant Examiner* — Thong P Truong

(57) ABSTRACT

Systems and methods of handling sessions between client devices and one or more server based on session classifications are provided. A device identifies a time series of security metrics corresponding to requests received during a session established by a client device to access a resource provided by one or more servers. The device generates security features from the time series of security metrics based on one or more time windows. The device classifies the session as one of anomalous or genuine using the security features generated from the time series of security metrics based on the one or more time windows. The device handles subsequent requests received during the session based on the classification of the session as the one of anomalous or genuine.

17 Claims, 9 Drawing Sheets

CLIENT-SERVER SESSION BASED ANOMALOUS BEHAVIOR DETECTION

BACKGROUND

In network environments, a device can route packets between client devices and servers to allow the client devices to access resources or services provided by the servers. To prevent against malicious attacks, the device can include a firewall that can detect and block malicious network activity. However, due to the increasingly various types of malicious network activity and the different types of resources or services that can be provided, it can be challenging to effectively block malicious network activity without incurring excessive false positive in which genuine network activity is erroneously prohibited.

SUMMARY

This technical solution is directed towards systems and methods of client-server session based anomalous behavior detection. In particular, the technical solution can handle sessions between client devices and one or more servers based on session classifications. For example, the system can determine whether a particular session is anomalous or genuine in real-time using log records corresponding to violations detected by a web application firewall. The system can apply a sliding window to occurrences of violations extracted from the violation records, and classify the occurrences corresponding to an instance of the sliding window as anomalous or genuine. The device can then handle the session responsive to the classification.

Thus, systems and methods of this technical solution can provide for zero touch or no touch anomalous session detection using violation records from web application firewalls. To do so, the technical solution can model session behavior, as opposed to just individual requests. The features used to model the session can include metrics corresponding to security violations established by an entity. The features can include the metrics occurring at each instance of time in the session. The technical solution can use a sliding window technique with a machine learning model to classify the session as anomalous or genuine.

At least one aspect is directed to a method of handling sessions between client devices and one or more server based on session classifications. The method can be performed by a device including one or more processors and memory. The method can include the device identifying a time series of security metrics corresponding to one or more requests received during a session established by a client device to access a resource provided by one or more servers. The method can include the device generating a plurality of security features from the time series of security metrics based on one or more time windows. The method can include the device classifying the session as one of anomalous or genuine using the plurality of security features generated from the time series of security metrics based on the one or more time windows. The method can include the device handling a request received during the session based on the classification of the session as the one of anomalous or genuine.

In implementations, the method can include the device identifying a plurality of violation records corresponding to the request received during the session. The device can determine the time series of security metrics based on the plurality of violation records. The method can include the device generating a plurality of violation records based on detecting one or more security violations associated with the requests received from the client device during the session. The device can determining the time series of security metrics based on the plurality of violation records.

The method can include the device generating a session identifier for the session. The device can associate a plurality of violation records based on the requests with the session identifier. The method can include the device blocking, responsive to the session being anomalous, the subsequent requests received from the client device during the session.

The method can include the device processing, responsive to the session being genuine, the subsequent requests received from the client device during the session. The method can include the device generating a second plurality of security features for a second one or more time windows of the session. The device can classify the session as one of anomalous or genuine using the second plurality of features based on the second one or more time windows. The device can process or block second subsequent requests received during the session based on the classification of the session as the one of anomalous or genuine based on the second one or more time windows.

The method can include the device determining the session is genuine based on the plurality of security features for the one or more time windows. The device can process, responsive to the session being genuine, the subsequent requests received from the client device during the session. The device can generate a second plurality of security features for a second one or more time windows of the session subsequent to the one or more time windows. The device can classify the session as anomalous using the second plurality of security features for the second one or more time windows. The device can terminate the session responsive to the classification of the session as anomalous based on the second plurality of security features.

The method can include the device determining a number of occurrences of each security metric of the time series of security metrics. The security metric can include at least one of cross site scripting, structured query language ("SQL") injection, broken authentication, form validations, malicious file uploads, security misconfigurations, component with a vulnerability, or sensitive data exposure. The device can generate the plurality of security features based on the number of occurrences of each security metric of the time series of security metrics.

The method can include the device training a classifier to classify the session as the one of anomalous or genuine. The device can train the classifier by receiving, for a predetermined classification, a plurality of violation records with time stamps that occurred during a time interval of a training session. The device can train the classifier by converting the plurality of violation records to a training time series of security metrics. The device can train the classifier by generating training security features based on the training time series of security metrics. The training security features can indicate a number of occurrences of a security metric during the time interval. The device can train the classifier with the training security features with an indication of the predetermined classification to cause the classifier to classify the session as the one of anomalous or genuine based on the plurality of security features.

At least one aspect is directed to a system to handle sessions between client devices and one or more server based on session classifications. The system can include a device including one or more processors and memory. The device can identify a time series of security metrics corresponding to requests received during a session established by a client device to access a resource provided by one or more servers. The device can generate a plurality of security features from the time series of security metrics based on one or more time windows. The device can classify the session as one of anomalous or genuine using the plurality of security features generated from the time series of security metrics based on the one or more time windows. The device can handle subsequent requests received during the session based on the classification of the session as the one of anomalous or genuine.

In implementations, the device can identify a plurality of violation records corresponding to the request received during the session. The device can determine the time series of security metrics based on the plurality of violation records. In implementations, the device can generate a session identifier for the session. The device can associate a plurality of violation records based on the requests with the session identifier.

The device can block, responsive to the session being anomalous, the subsequent requests received from the client device during the session. The device can generate a second plurality of security features for a second one or more time windows of the session. The device can classify the session as one of anomalous or genuine using the second plurality of features based on the second one or more time windows. The device can process or block second subsequent requests received during the session based on the classification of the session as the one of anomalous or genuine based on the second one or more time windows.

The device can determine the session is genuine based on the plurality of security features for the one or more time windows. The device can process, responsive to the session being genuine, the subsequent requests received from the client device during the session. The device can generate a second plurality of security features for a second one or more time windows of the session subsequent to the one or more time windows. The device can classify the session as anomalous using the second plurality of security features for the second one or more time windows. The device can terminate the session responsive to the classification of the session as anomalous based on the second plurality of security features.

The device can determine a number of occurrences of each security metric of the time series of security metrics. The security metric can include at least one of cross site scripting, structured query language ("SQL") injection, broken authentication, form validations, malicious file uploads, security misconfigurations, component with a vulnerability, or sensitive data exposure. The device can generate the plurality of security features based on the number of occurrences of each security metric of the time series of security metrics.

The device can train a classifier to classify the session as the one of anomalous or genuine. To train the classifier, the device can receive, for a predetermined classification, a plurality of violation records with time stamps that occurred during a time interval of a training session. The device can convert the plurality of violation records to a training time series of security metrics. The device can generate training security features based on the training time series of security metrics. The training security features can indicate a number of occurrences of a security metric during the time interval. The device can train the classifier with the training security features with an indication of the predetermined classification to cause the classifier to classify the session as the one of anomalous or genuine based on the plurality of security features.

At least one aspect is directed to a non-transitory computer-readable medium storing instructions that, when executed by one or more processors, cause the one or more processors to handle session between client devices and one or more servers based on session classifications. The instructions can include instructions to receive a plurality of historical violation records with time stamps. The instructions can include instructions to convert the plurality of historical violation records to a training time series of security metrics. The instructions can include instructions to generate training security features based on the training time series of security metrics. The training security features can indicate a number of occurrences of a security metric. The instructions can include instructions to train a classifier with the training security features with an indication of a predetermined classification to cause the classifier to output session classifications based on inputted security features. The instructions can include instructions to provide the classifier to a device that receives requests from a client device that established a session with a server to cause the device to use the classifier to classify the session as anomalous based on a time series of security metrics generated for the requests that occurred during a time window within the session.

In implementations, the instructions can include instructions to update the classifier based on an indication of excessive false positives or false negatives with second training security features and the indication of the predetermined classification.

The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Figure 1A:
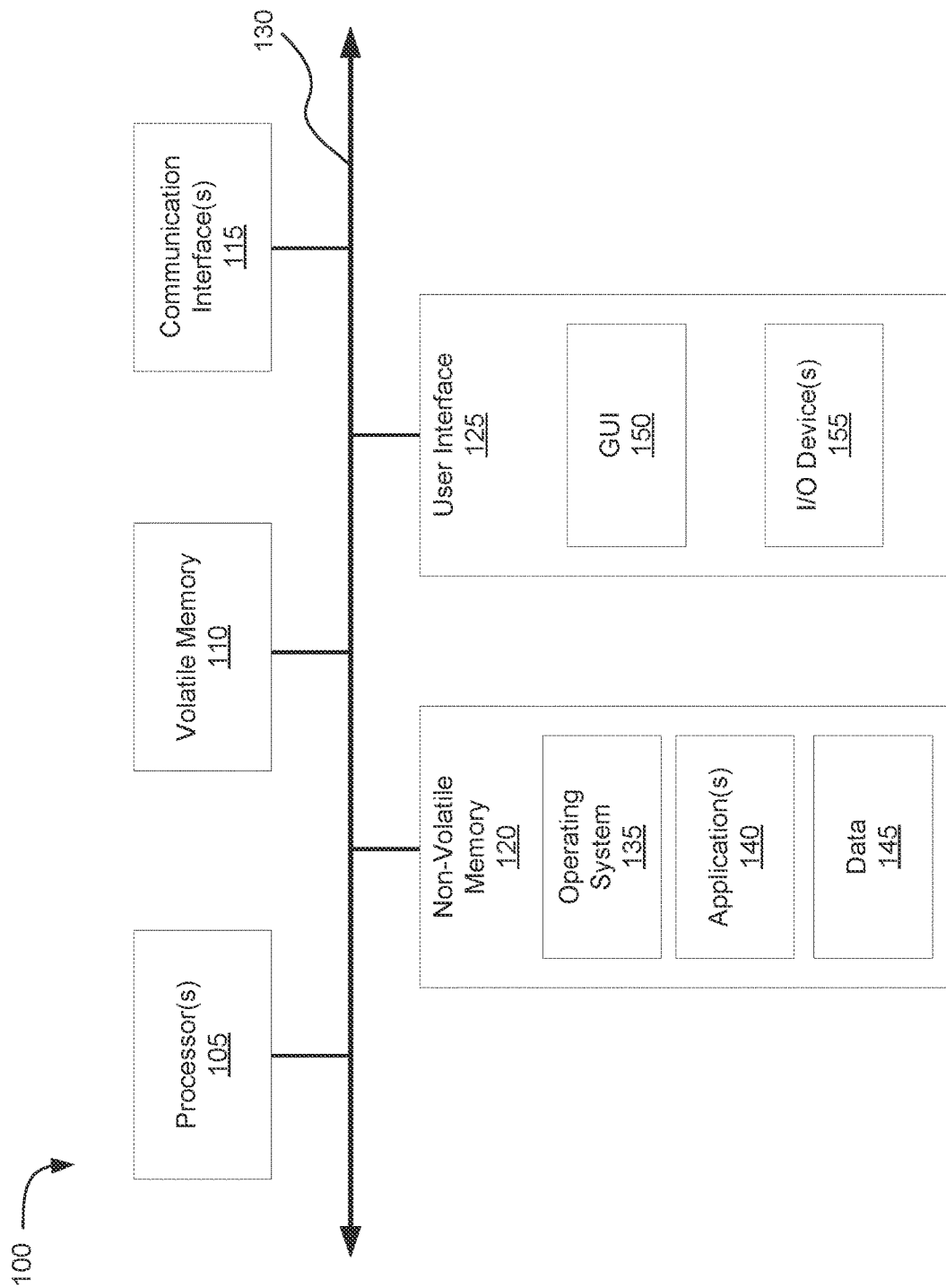
FIG. 1A is a block diagram of embodiments of a computing device.

Systems and methods of client-server based anomalous behavior detection are provided. In particular, this technical solution can handle sessions between client devices and one or more servers based on session classifications. For example, the system can determine whether a particular session is anomalous or genuine in real-time using log records corresponding to violations detected by a web application firewall.

A device can be intermediary to client devices and servers. The intermediary device can manage sessions or connections between the client devices and the servers, including managing the network traffic between the client devices and the servers. For example, client devices can access a service, resource, or data hosted or provided by the servers through a network. The intermediary device an application delivery controller or a gateway that can accelerate, optimize, load balance, or provide security for sessions or requests.

The intermediary device can provide security protection using a firewall. For example, the intermediary device can implement a web application firewall ("WAF") to provide security protection using a pattern matching technique. A WAF can refer to or include a type of an application firewall that filters, monitors, and blocks hypertext transport protocol ("HTTP") traffic to and from a web service hosted by one or more servers. By inspecting HTTP traffic, the WAF can prevent attacks exploiting a web application's known vulnerabilities, such as a structured query language ("SQL") injection, cross-site scripting (XSS), file inclusion, and improper system configuration.

To configure a WAF, an administrator, entity, or other operator can enable security protections. The administrator can further configure the WAF with relaxations to remove false positives, without which the WAF of the intermediary device can inadvertently block genuine users and sessions, thereby erroneously blocking genuine requests and preventing genuine users from accessing a service hosted by the server. The relaxations can be added to allow legitimate users to access the web application. To add relaxations, the WAF can be trained in a learning mode in which requests are not blocked. However, the traffic used to train the WAF may not be representative or include traffic generated by anomalous entities, thereby resulting in false negatives and causing anomalous traffic to be treated as a genuine user behavior. However, due to the large volume of network traffic and various types of behaviors during a session, it can be challenging to reduce false negatives or false positives, thereby configuring a WAF to erroneously allow anomalous network traffic or block genuine network traffic. Further, it can be challenging, time consuming, and resource intensive to manually review each rule learnt by the WAF for every uniform resource locator ("URL") to check for validity, thereby introducing delays in properly configuring the WAF, inability to properly configure the WAF.

Anomalous sessions can include network traffic from many entities, including, for example, bots, scanners, content scrapers, malicious users, fuzzers, common vulnerabilities and exposures ("CVE") based exploits, vulnerability scanners, unusual file uploads, sensitive data theft, penetration testers and HTTP denial of service ("DoS") attacks. To efficiently, effectively, and reliably classify sessions as anomalous or genuine without excessive false negatives or false positives, systems and methods of this technical solution can provide a zero-touch next generation WAF solution. This technical solution can detect whether a WAF user session is anomalous or genuine in real time (e.g., responsive to requests received or behavior detected during the session, prior to completion of the session). For example, the system can be configured with a machine learning technique to model WAF session behavior. Instead of classifying each request as harmful or not, the system can base the classification on the session behavior detected up to a current instance of time. The system can use a session identifier ("ID") generated by the WAF provided by the intermediary device to identify requests belonging to a session. Based on the classification for each session, the system can block anomalous sessions, while continuing to allow sessions classified as being genuine. To prevent attacks in the future, the system can feedback information such as client internet protocol ("IP") address, geolocation and session ID to the intermediary device. Thus, this technical solution can reduce the likelihood of a genuine user or session being blocked, while reducing or not increasing the likelihood that an anomalous session is allowed.

However, classifying a session prematurely can lead to incorrect classifications, and classifying a session after the session terminates may not be useful because the session may have already caused the intended harm to the servers. To address this technical challenge, this technical solution can classify the session at regular time intervals during the session such that anomalous sessions can be blocked with minimal, if any, harm to the server. The system can use a sliding window mechanism to determine the regular intervals, which can preserve the time series nature of the session. Each classification made by the system can use the violation data from a number of consecutive timestamps. For example, if the sliding window size is configured as n, for the first classification the system can use data from 0 to n timestamps and for the second classification the system can use data from 1 to n+1 timestamps. This data can be input into a machine learning engine or model, such as a random forest or isolation forest, to classify the behavior for the selected time window in the session.

For example, the system can receive violation log records from an intermediary device providing a WAF security function. The system can stream the violation records to a feature generator of the system to process the violation records and generate security metrics (e.g., a security metric defined, established or maintained by an entity or organization, such as the Open Web Application Security project "OWASP", which can be an online or other community) for each time stamp. For example, the feature generator can extract, from each violation record, the number of occurrences of each of the following types of violations: cross site scripting, SQL injections, broken authentication, form validations, malicious file uploads, security misconfigurations, CVEs, sensitive data exposure (e.g., credit card information, social security, data breaches, etc.). The feature generator can also use the time difference between the first and last record for every window to generate a security metric.

The feature generator can provide the generated security metrics to a sliding aggregator, which can move a sliding window over the input security metrics to generate aggregated features. The system can input the aggregated features into a machine learning model, either to train the model during the training phase, or classify the session during a session handling phase. During the session handling phase, the system can make one or more predictions for each session, and then classify the session based on the one or more classifications for the session.

For purposes of reading the description of the various embodiments below, the following descriptions of the sections of the specification and their respective contents can be helpful:

Section A describes a computing environment which can be useful for practicing embodiments described herein.

Section B describes systems and methods for handling sessions between clients and servers based on session classifications.

A. Computing Environment

Prior to discussing the specifics of embodiments of the systems and methods of managing performance of elements in a multi-hop network topology, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
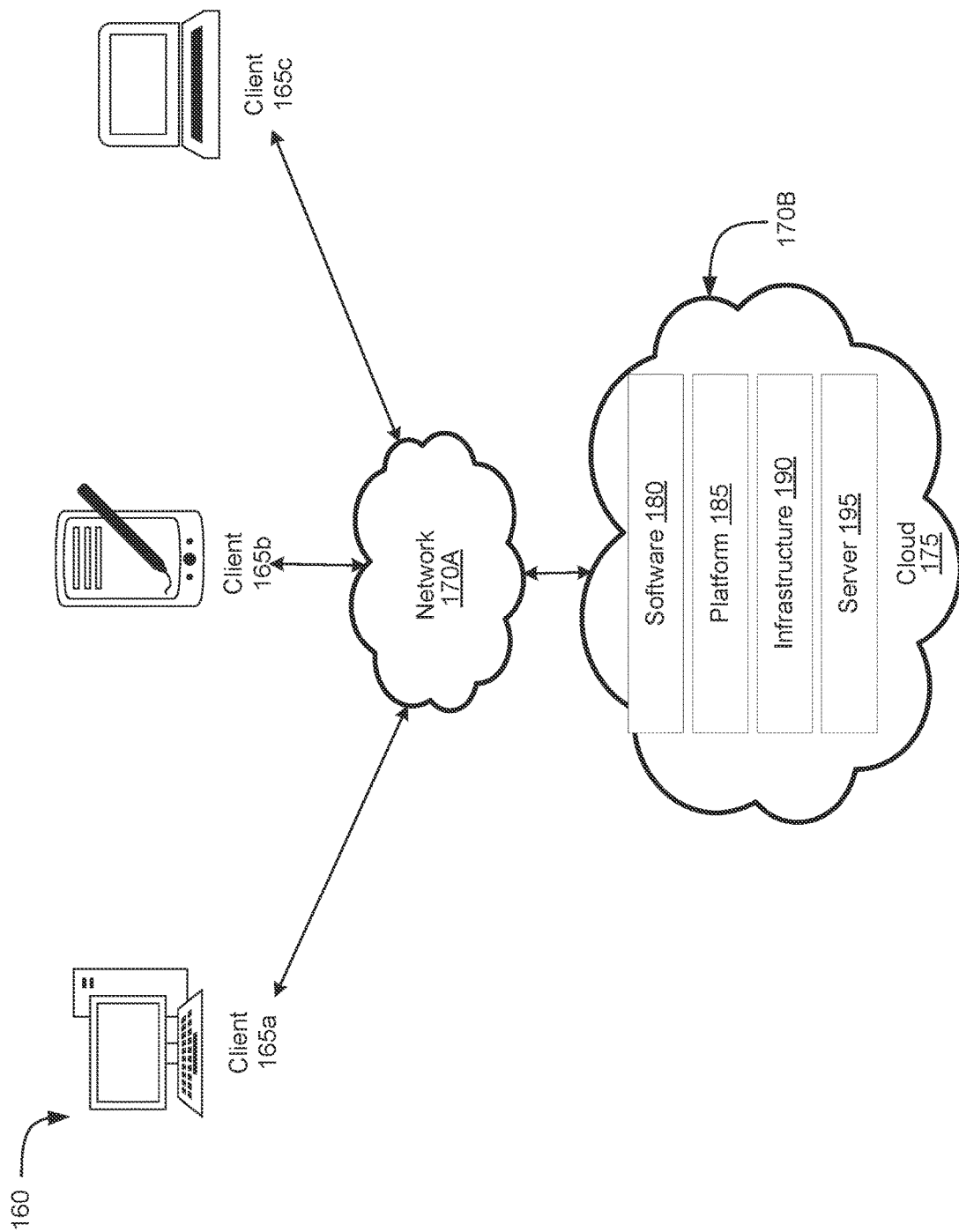
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Systems and Methods for Handling Sessions Between Clients and Servers Based on Session Classifications Systems and methods for handling session between clients and servers based on session classifications is provided. For example, an entity that provides a resource or service (e.g., a website, software-as-a-service, cloud storage system, payment processing, e-commerce, electronic mail system, etc.) via a server may implement a network security system to protect against attacks on the resource, service or server. The network security system can provide a web application firewall, for example, that can use pattern matching features to detect attacks. However, as new entities being using a WAF, there may be excessive false positive classifications that result in blocking genuine network traffic. To mitigate against excessive false positive classifications, the entity can relax a pattern, which may inadvertently allow malicious users to attack the server. For example, relaxing a pattern relating to an SQL injection attack can cause the network security system to allow the attack on the server to occur. The network security system may allow the attack to occur because the system can be configured to analyze only a single request at a time to reject or block the request. An attack on a resource, service or server can cause downtime in the resource, service or server, loss of data, or excessive network bandwidth utilization, memory utilization, or processor utilization.

To reduce the likelihood of attacks on servers, or improve the likelihood of a network security system blocking an attack in real-time without blocking genuine sessions, systems and methods of this technical solution can analyze the behavior of the session over multiple requests aggregated using a sliding window. The system can receive violation records from a WAF that is handling the network session between the client device and server. The violation records can correspond to web application vulnerabilities or network security metrics. The violation records containing the security metrics can be streamed as a time series. The feature generator can receive the time series of security metrics and generate a security features for the time stamp. For example, the streamed time series of security metrics can indicate, for a single type of violation, all the corresponding time stamps for when the violation was detected. The feature generator can convert the streamed time series of security metrics to a security feature which indicates, for a single time stamp, which violations were detected.

The system can aggregate the security features for a time range or sliding time window, and input the aggregated security features into the classifier. The classifier can be trained using a machine learning technique, such as random forest. The training data can include historical network traffic data. The training data can be generated using security features that were generated from security metrics. The training data can include a matrix with security features, vulnerabilities, and the number of occurrences at each time stamp or time range, as illustrated in Table 1.

TABLE 1

Example illustration of Matrix Input to Classifier

| Time Stamp | # of Occurrences of Violation_1 | # of Occurrences of Violation_2 |
|---|---|---|
| P1 | 1 | 3 |
| P2 | 2 | 4 |
| P3 | 1 | 5 |

Table 1 includes a column with time stamps, and one or more columns that indicate a number of occurrences of a violation. For example, the first column includes a first time stamp P1, a second time stamp P2, and a third time stamp P3. Each time stamp can correspond to an instance in time, or a time range that is less than the time window used by the sliding window aggregator. Each time stamp P1, P2, and P3 and corresponding to a violation record generated by the WAF. The types of vulnerabilities indicated in the one or more next columns can include, for example, cross site scripting, SQL injections, broken authentication, form validations, malicious file uploads, security misconfigurations, CVEs, sensitive data exposure (e.g., credit card information, social security, data breaches, etc.). The matrix indicates the count of each violation at each time Pn.

This matrix illustrated in Table 1 can be input into the classifier for training or for classification of a session in real time. In implementations, the sliding window aggregator can add the counts of a violation across multiple times, and input the aggregated features into the classifier. For example, if the aggregator applies a sliding window that includes P1 and P2, then the count of Violation_1 is 3 over the window, and the count of Violation_2 is 7. If the sliding window moves to P2 and P3, then the count of Violation_1 becomes 7, and the count of Violation_2 becomes 9. The classifier can output a prediction or classification for the current sliding time window. If the classification is anomalous, the classifier can instruct the WAF to block the requests or terminate the session. If the classification is genuine, the classifier can instruct the WAF to allow the requests or session to continue. For example, the classifier can determine that the classification based on a first sliding time window of the session is genuine, but then determine during a subsequent sliding time window of the session that the classification is anomalous, and then block requests of the session or terminate the session. Thus, the classifier can reliably detect anomalous behavior in a client-server session in real-time, and without excessive false negatives.

Figure 2:
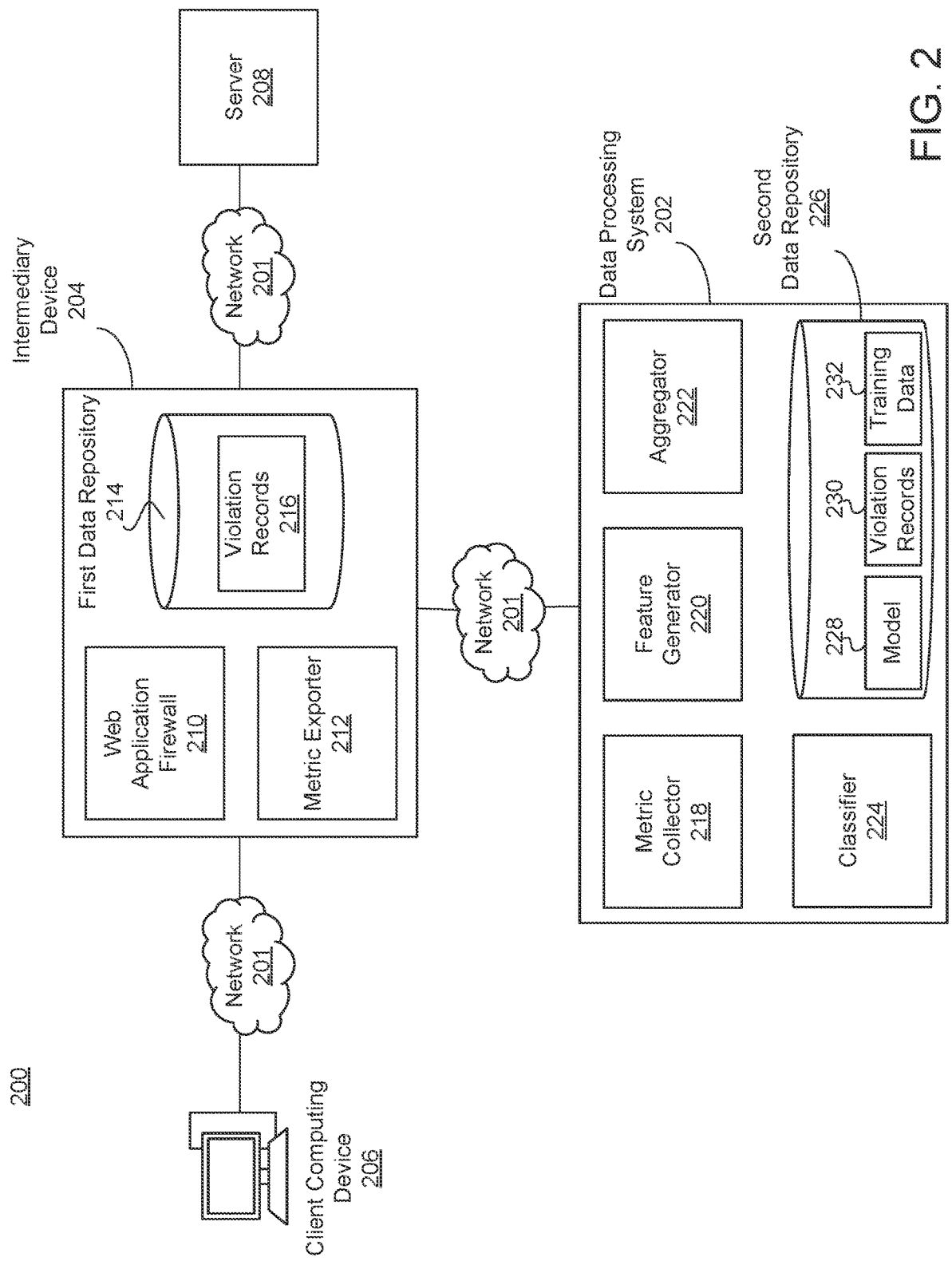
FIG. 2 is a block diagram of a system to handle sessions between clients and servers based on session classifications, in accordance with an implementation.

Referring to FIG. 2, depicted is a block diagram of a system to handle sessions between clients and servers based on session classifications. The system 200 can include an intermediary device 204 that can interface or communicate with a client computing device 206 via a network 201 (e.g., network 170 or network 170A, or network 170B). The intermediary device 204 can be intermediary to one or more client computing devices 206 and one or more servers 208 to handle or manage sessions between the client computing devices 206 and the one or more servers 208. The intermediary device 204 can include one or more servers, such as servers 195, or be part of the cloud 175. The intermediary device 204 can include or be part of a data center. The intermediary device 204 can include or be referred to as one or more processors, or one or more servers, or a cloud computing environment. The client computing device 206 can include one or more component or functionality of client device 165a-c depicted in FIG. 1B. The intermediary device 204 can interface with or communicate with a server 208. The server 208 can refer to or include server 195, or be part of cloud 175. The server 208 can provide resources or services, such as a software-as-a-service application. The server 208 can host applications, documents, or other resources accessed or utilized by the client computing device 206 via The intermediary device 204.

The intermediary device 204 can be intermediary or between the client computing device 206 and the server 208 in the network topology, which can include network 201 or multiple branches of network 201. The intermediary device 204 can be used to authenticate or provide single sign on services to the client device 206. The intermediary device 204 can refer to or include an application delivery controller ("ADC"). An ADC can perform various tasks to facilitate or manage network traffic or sessions, such as web acceleration, load balancing, or network security, for example. The intermediary device 204 can communicate with the client device 206 to provide access to a resource or service hosted by the server 208. The intermediary device 204 can communicate with the client device 206 to provide virtual applications or a virtual desktop or other resources hosted by the server 208. The intermediary device 204 can include memory or a storage device. The memory can be a non-transitory or non-volatile memory. Non-transitory memory can refer to computer-readable media or machine readable storage medium that can store data for short period or in the presence of power, such as a memory device or random access memory ("RAM"). The memory can be used by intermediary device 204 to handle sessions between client devices and servers.

The intermediary device 204 can include a web application firewall ("WAF") 210 that can provide network security for the sessions between the client device 206 and the server 208. The intermediary device 204 can include a metric exporter 212 that can identify violation records, violation events, or other security metrics identified or generated by the WAF 210, and provide the network security metrics to a data processing system 202. The intermediary device 204 can include a first data repository 214 to store information associated with one or more functions or components of the intermediary device 204, including, for example, violation records 216.

The WAF 210 and metric exporter 212 can each include at least one processing unit or other logic device such as programmable logic array engine, or module configured to communicate with one or more other system or component depicted in FIG. 2. The WAF 210 and metric exporter 212 can be separate components, a single component, or part of the cloud 175 or server 195.

The system 200 can include, interface with, or otherwise access a data processing system 202. The data processing system 202 can be separate from the intermediary device 204. In implementations, the data processing system 202 can be part of or include the intermediary device 204. In implementations, the data processing system 202 can be hosted on in a same data center or cloud 175 as the intermediary device 204. The data processing system 202 can include one or more servers, such as servers 195, or be part of the cloud 175. The data processing system 202 can include or be part of a data center. The data processing system 202 can include or be referred to as one or more processors, or one or more servers, or a cloud computing environment. The data processing system 202 can include a metric collector 218 to receive metrics streamed or provided from the intermediary device 204. The data processing system 202 can include a feature generator 220 to generate features from the network security metrics received from the intermediary device 204. The data processing system 202 can include an aggregator 222 to apply a sliding window or otherwise aggregate one or more portions of the metrics or features. The data processing system 202 can include a classifier 224 to analyze the features or aggregated features and classify the session as anomalous or genuine. The data processing system 202 can include a second data repository 226 storing information or data that can facilitate classification of sessions, including for example a model 228, violation records 230, or training data 232.

The system 200 and its components can include hardware elements, such as one or more processors, logic devices, or circuits. The data processing system 202, intermediary device 204, client computing device 206, or server 208 can include or be implemented using hardware or a combination of software and hardware. For example, components of the data processing system 202, intermediary device 204, client computing device 206, or server 208 can include logical circuitry (e.g., a central processing unit or CPU) that responds to and processes instructions fetched from a memory unit. Components of the data processing system 202, intermediary device 204, client computing device 206, or server 208 can include or use a microprocessor or a multi-core processor. A multi-core processor can include two or more processing units on a single computing component. Components of the data processing system 202, intermediary device 204, client computing device 206, or server 208 can be based on any of these processors, or any other processor capable of operating as described herein. Processors can utilize instruction level parallelism, thread level parallelism, different levels of cache, etc. For example, the data processing system 202, the intermediary device 204, client computing device 206, or server 208 can include at least one logic device such as a computing device or server having at least one processor 105. The components and elements of the data processing system 202, the intermediary device 204, client computing device 206, or server 208 can be separate components or a single component. For example, the data processing system 202 and the intermediary device 204 can be a single component. The data processing system 202, intermediary device 204, client computing device 206, or server 208 can include a memory component, a random access memory (RAM) or other dynamic storage device, a storage device for storing information, and instructions to be executed. The memory can include at least one read only memory (ROM) or other static storage device coupled with the storage device for storing static information and instructions. The memory can include a storage device, such as a solid state device, magnetic disk or optical disk, to persistently store information and instructions.

Still referring to FIG. 2, and in further detail, the system 200 can include, access, communicate with, or otherwise interface with a client computing device 206 that executes or provides a client application. The client computing device 206, via client application, can establish a session or connection with the server 208 via the intermediary device 204. The session or connection can refer to a session to access a resource or service provided by the server 208, such as a web or SaaS delivered application from the server 208. The client computing device 206 can include one or more client applications, such as a web browser or agent, configured to establish a session with the server 208 via the intermediary device 204 to access one or more virtual applications or resources. A malicious actor of the client computing device 206 can execute an attack on the server 208 using various techniques, which can result in network latency, server latency, application or server downtime, data breaches, or other server disruption or data breach or data loss. In implementations, the malicious client device 206 can include, execute, or facilitate one or more of a bot, scanner, content scraper, malicious user, fuzzer, common vulnerabilities and exposures ("CVE") based exploit, vulnerability scanner, unusual file upload, sensitive data theft, penetration tester, or HTTP denial of service ("DoS") attack.

The intermediary device 204 can be designed, constructed and operational to manage network traffic corresponding to sessions or connections between the client computing device 206 and the server 208. The intermediary device 204 can receive requests from the client computing device 206 for a resource or service, and forward the request to the server 208. The server 208 can respond to the request and provide the response to the intermediary device 204 for routing back to the client computing device 206. To process the network traffic and manage the connections, the intermediary device 204 can use one or more packet engines.

To prevent attacks on the server 208 from malicious client devices 206, without blocking access for genuine client devices 206, the intermediary device 204 can include a WAF 210 designed, constructed and operational to provide network security. The WAF 210 can refer to or include an application firewall that filters, monitors, or blocks HTTP traffic to and from a web service provider by a server 208. The WAF 210 can inspect HTTP traffic and prevent attacks exploiting known vulnerabilities of a web application, such as cross site scripting, SQL injections, broken authentication, form validations, malicious file uploads, security misconfigurations, CVEs, sensitive data exposure (e.g., credit card information, social security, data breaches, etc.). The feature generator can also use the time difference between the first and last record for every window to generate a security metric.

In implementations, the WAF 210 can be deployed in front of web applications and configured to analyze bi-directional web-based (HTTP) traffic—detecting and blocking anything malicious. The WAF 210 can be configured with a WAF policy that can include one or more rules or patterns with which to analyze the network traffic in order to detect an attack corresponding to a vulnerability of an application, resource or web application provided by the server 208. The WAF 210, using the rules or policies, can protect web applications by filtering, monitoring, and blocking any malicious HTTP/S traffic traveling to the web application, and preventing unauthorized data from leaving the web application. For example, the WAF policy can facilitate determining what traffic is malicious and what traffic is safe, thereby protecting the server 208.

The WAF 210 can be configured with a policy or rule to analyze the traffic. In implementations, the policy can be customized or tailored to a particular application, resource or service provided by the server 208. However, as the source and types of attacks becomes more voluminous, complex or challenging to predict, or as new web applications come online, it can be challenging to configure a WAF policy that can effectively block malicious traffic without blocking genuine traffic.

Responsive to detecting a violation associated with a request or other network activity during a session, the WAF 210 can generate a violation record 216 or other log. The WAF 210 can associate the violation record with a session ID and a time stamp. For example, the intermediary device 204 can generate a session identifier for the session responsive to a request to establish the session, and associate violation records based on the requests for the session with the session identifier. The violation record 216 can include the session ID. The violation record 216 can include the a time stamp for when the violation was detected and a security metric. The security metric can indicate the type of violation or vulnerability. For example, the time series of security metrics can include an indication or identifier of a violation, a session identifier, and a time stamp. The violation records 216 for a session can be stored as an array or matrix with rows representing the type of network security metric (e.g., type of violation) and columns representing time stamps or other indication of a sequence or order of requests. For example, security metric can be a series of time stamps that indicate occurrences of one or more of cross site scripting, SQL injections, broken authentication, form validations, malicious file uploads, security misconfigurations, CVEs, sensitive data exposure (e.g., credit card information, social security, data breaches, etc.).

The intermediary device 204 can include a metric exporter 212 designed, constructed and operational to provide the security metrics or violation records 216 to a data processing system 202 for further processing. The metric exporter 212 can export or provide a time series of security metrics to the data processing system 202 via a network 201. The metric exporter 212 can provide the time series of security metrics as a data stream, feed, or push. The metric exporter 212 can provide the time series of security metrics in real time during the session. The metric exporter 212 can include a session identifier for each stream of the time series of security metrics for processing by the data processing system 202. The metric exporter 212 can include additional information associated with the session, such as a start time of the session, location information associated with the client computing device 206 establishing the session, type of web application, provider of the web application, or identifier of the web application, server information, etc. For example, the intermediary device 204 can generate a session identifier responsive to a request from the client computing device 206 to establish a session to access the resource or service provided by the server 208.

The metric exporter 212 can establish a communication channel with the data processing system 202 to provide the stream of the time series of network security metrics. In implementations, the metric exporter 212 and WAF 210 can be part of the data processing system 202, in which case the data processing system 202 can receive the stream of security metrics use a data communication technique or channel.

The system 200 can include, access, or otherwise interface with a data processing system 202. The data processing system 202 can receive the network security metrics and classify the session as anomalous or genuine, and provide the classification back to the WAF 210 to cause the WAF 210 to block or continue allowing the session. The data processing system 202 can be referred to or include a device having one or more processors and memory, for example. To do so, the data processing system 202 can include a metric collector 218 designed, constructed and operational to identify a time series of security metrics corresponding to requests received during a session established by the client device 206 to access a resource provided by one or more servers 208. The metric collector 218 can receive a stream of the time series of security metrics in real time. Real time can refer to receiving the metrics during the session from the metric exporter 212 or intermediary device 204. Receiving the stream of security metrics can refer to receiving the data as each violation is detected and recorded, as opposed to in a batch upload after the session has terminated, for example. By receiving the stream of security metrics in real time, the data processing system 202 can classify the behavior of the session in real time and block or allow network traffic from the client device 206. The metric collector 218 can store the stream of security metrics as violation records 230 in the second data repository 226 of the data processing system 202. In some implementations in which the data processing system 202 can perform the functionality of the intermediary device 204, there can be a single data repository.

The stream of security metrics can include a data structure that includes, for each record, a session ID, a time stamp, and a type of violation or vulnerability. Each record can correspond to a violation detected by the WAF 210 using a WAF policy, rule or pattern. The metric collector 218 can establish a communication session with the metric exporter 212 to receive the security metrics.

Thus, the intermediary device 204 (or the data processing system 202 if the data processing system 202 is performing one or more functionality of the intermediary device 204), can generate the violation records 216 based on detecting one or more security violations associated with the requests received from the client device 206 during the session. The intermediary device 204 (or data processing system 202, for example) can determine the time series of security metrics based on the plurality of violation records. For example, the violation records can be generated responsive to detection of the violation and assigned a corresponding time stamp, and streamed or provided to the metric collector 218 as a time series of violation records.

The data processing system 202 can include a feature generator 220 designed, constructed and operational to process or pre-process the security metrics received by the metric collector 218 from the intermediary device 204. The feature generator 220 can generate security features from the time series of security metrics based on one or more time windows. For example, a security metric can include a series of time stamps of occurrences of a particular type of violation of vulnerability. The feature generator 220 can generate, for a particular time stamp or range of time stamps, a security feature that indicates the number of occurrences of the particular violation or vulnerability. For example, the security metric can indicate multiple time stamps for a single violation, whereas the security feature can indicate which violations occurred at a single time stamp. Table 2 depicts an illustrative example of a security metric for a particular session ID.

TABLE 2

Illustrative example of a time series of security metrics for a session ID

| Violation | Times of Occurrences |
|---|---|
| V1 | {t1, t2, t3, t4, t7} |
| V2 | {t2, t3, t5} |
| V3 | {t1, t4, t5} |
| V4 | {t3, t7} |
| V5 | {t2, t3} |

As shown in Table 2, the security metric can be depicted as an array or matrix. Each row in the table corresponds to a different type of violation or vulnerability, which is indicated in column 1 as a type 1 violation ("V1"), type 2 violation ("V2"), type 3 violation ("V3"), type 4 violation ("V4"), and type 5 violation ("V5"). The second column indicates the time stamps for when the particular violation was recorded or detected by the WAF 210 and stored in the violation records 216. For example, V1 occurred at time stamps t1, t2, t3, t4 and t7; violation 2 occurred at time stamps t2, t3 and t5; V3 occurred at time stamps t1, t4 and t5; V4 occurred at time stamps t3 and t7; and V5 occurred at time stamps t2 and t3. Thus, the data processing system 202 can identify violation records corresponding to one or more requests received during a session, and determine the time series of security metrics based on the violation records.

The feature generator 220 can receive the security metrics (e.g., Table 2) and convert the security metrics to security features. A security feature can indicate, for a particular time stamp, which violations occurred. Table 3 depicts an illustrative example of a security feature for a particular session ID.

TABLE 3

Illustrative example of security features for a session ID

| Time Stamp | Times of Occurrences |
|---|---|
| T1 | {V1, V3} |
| T2 | {V1, V2, V5} |
| T3 | {V1, V2, V4, V5} |
| T4 | {V1, V3} |
| T5 | {V2, V3} |
| T6 | [null] |
| T7 | {V1, V4} |

As shown in Table 3, the security feature can be depicted as an array or matrix. Each row in the table corresponds to a different time stamp in the session, which are indicated in column 1. The second column lists the violations that occurred during the time stamp in the session ID, as recorded or detected by the WAF 210. For example, the first security feature for time stamp t1 includes V1 and V3; the second security feature for t2 includes V1, V2 and V5; the third security feature for T3 includes V1, V2, V4, and V5, etc.

In some cases, there can be more than one instance of a same violation detected for a time stamp, as illustrated in Table 4 as follows:

TABLE 4

Illustrative example of security features with multiple occurrences of a violation for a session ID

| Time Stamp | Times of Occurrences |
|---|---|
| T1 | {V1(2), V3(1)} |
| T2 | {V1(1), V2(4), V5(2)} |
| T3 | {V1(1), V2(3), V4(1), V5(1)} |
| T4 | {V1(1), V3(1)} |
| T5 | {V2(1), V3(1)} |
| T6 | [null] |
| T7 | {V1(1), V4(1)} |

As illustrated in Table 4, the security feature for T1 can include violations V1 and V3. The T1 security feature can indicate multiple occurrences of a particular violation. For example, Table 4 illustrates 2 occurrences of V1 in T1 security feature, and 1 occurrence of V3. In some cases, the security feature can include an indication of all violations, regardless of whether they occurred, but indicate the number of occurrences is zero (e.g., V2(0) at T1). For example, the feature generator 220 can extract, from each violation record 216, the number of occurrences of each of the following types of violations: cross site scripting, SQL injection, broken authentication, form validations, malicious file uploads, security misconfigurations, CVEs, sensitive data exposure (e.g., credit card information, social security, or other personally identifying number or private identifier), or the time difference between the first and last record in each time window.

In implementations, the feature generator 220 can perform additional pre-processing to generate the security features, such as cleaning the data or filtering out data that may not be relevant or not facilitate session classification. For example, the violation records 216 or received security metrics can include many different types of violations. However, the feature generator 220 can select a subset of violations for which to generate security features. For example, the feature generator 220 can select predetermined set of violations, which can be a top ranking set of violations corresponding to most common attacks or vulnerabilities, or most consequential attacks or vulnerabilities. The subset of violations selected by the feature generator 220 can correspond to the types of violations for which the classifier 224 is trained or for which the classifier 224 can predict a classification with a high level of confidence.

The data processing system 202 can include an aggregator designed, constructed and operational to aggregated one or more security features. The aggregator 222 can include or be configured with any aggregation technique. For example, the aggregator 222 can use a sliding time window aggregation technique to combine neighboring or consecutive security features based on time stamps. A sliding time window can refer to a fixed size time window that is applied to subsequent increments of time from one instance to the next. For example, the size of the time window can be 2, 3, 4 or other size that facilitates classifying the session as anomalous or genuine. The aggregator 222 can combine T1 and T2 security features to generate a new aggregated security feature: {V1(3), V2(4), V3(1), V5(2)}. This new aggregated security feature adds the number of occurrences of the violations during the two time stamps.

The aggregator 222 can slide this time window to generate a second aggregated security feature by combining T2 and T3 to generate a second aggregated feature: {V1(2), V2(7), V4(1), V5(3)}. The aggregator 222 can continue to slide the time window as the duration of the session continues and until the session is terminated or blocked, for example.

The aggregator 222 can combine the occurrences of the violations by adding the occurrences together from the respective security features. In some cases, the aggregator 222 can multiply the occurrences. In some cases, the aggregator 222 can add weights to the occurrences prior to or upon combining them. Different weights can be assigned to different types of violations, for example, based on consequences associated with the violation. In some cases, the aggregator 222 can apply different weights to different time stamps in the time window. For example, the aggregator 222 can adjust the weight according to a decay function that weights a current time stamp more heavily than an older time stamp.

The aggregator 222 can, in some cases, combine the occurrences of the violations in a manner that accounts for a duration of time. For example, there can be instances in which certain violations may not occur during a time window, but should be accounted for as they may not have occurred at a particular time stamp. Since attackers can quickly generate requests, the time between records can be important. Further, the time between the records can correspond to a security feature itself as small time between records can indicate an increased likelihood of the session being anomalous relative to a longer time between requests. Thus, when applying the time window, the aggregator 222 can divide the number of occurrences by the duration of the time window.

The data processing system 202 can include a classifier 224 designed, constructed and operational to classify the session. The classifier 224 can classify the session as anomalous or genuine. The classifier 224 can predict whether the session is anomalous or genuine. The classifier 224 can predict that the session is more likely to be anomalous for a given time window of the sliding time windows relative to being genuine. The classifier 224 can update the classification as the time window slides as the session continues and additional network security metrics are streamed, converted to security features, and aggregated, for example.

A classification as anomalous can refer to the session likely including or corresponding to an attack of a vulnerability associated with the web application that the WAF 210 is configured to protect against. The classification as anomalous can indicate that the client computing device 206 that established the session is malicious, or has been compromised by a malicious actor or entity. The classification as genuine can indicate the lack or absence of anomalous or malicious behavior at a given moment.

To classify the session behavior as anomalous or genuine, the classifier 224 can use a model 228. The model 228 can be trained using a machine learning technique. The machine learning technique can include, for example, one or more of random forest, random decision forest, a regression, or other machine learning technique. Random forest and random decision forests can refer to ensemble learning methods for classification that can construct a multitude of decision trees at training time, and output the class that is the mode of the classes (classification) or mean/average prediction (regression) of the individual trees.

To train the model 228 using the random forest or random decision forest machine learning technique, the classifier 224 can obtain training data 232. Training data 232 can include historical security features that resemble Table 3 or Table 4 illustrated above. In some cases, the training data can include aggregated security features corresponding to sliding time windows. The training data 232 can further include an indication as to whether the security feature corresponds to an attack or anomalous session.

The data processing system 202 can train the model 228 by inputting the training data 232, including a time series of security metrics, security features, or aggregated security features on a sliding time window into a machine learning engine, such as random decision forest. The machine learning engine can use bagging and feature randomness to build an individual try to create an uncorrelated forest of trees whose prediction by committee is more accurate than that of an individual tree. The random forest approach can average multiple deep decision trees, trained on different parts of the same training set, with the goal of reducing the variance.

The training function for random forests can apply a bootstrap aggregation (or bagging) to tree learners. For example, the training data 232 can include a training set with responses, and the classifier 224, during bagging, can repeatedly select a random sample or subset of features with replacement of the training set and fit trees to these samples. After training, the classifier 224, using the model 228, can predict classification for unseen samples (e.g., new aggregated security features) by taking the majority vote amongst the trees as to whether the aggregated security features correspond to an anomalous session or genuine session.

Thus, the data processing system 202 can train the classifier 224 or model 228 used by the classifier 224 by receiving violation records with time stamps that occurred during a time interval of a training session, converting the plurality of violation records to a training time series of security metrics, generating training security features based on the training time series of security metrics that indicate a number of occurrences of a security metric during the time interval, and training the classifier with the training security features with an indication of the predetermined classification (e.g., anomalous or genuine) to cause the classifier to classify the session as the one of anomalous or genuine based on the plurality of security features.

The classifier 224 can classify the session as anomalous or genuine. The classifier 224 can generate multiple classifications for a session throughout the duration of the session.

For example, at the beginning of a session, the classifier 224 can classify the session as genuine, but as violations change or increase, the classifier 224 can predict that the session is anomalous. The classifier 224 can provide the classification to the WAF 210. The classifier 224 can provide each classification to the WAF 210. The classifier 224 may only provide the classifications of anomalous to the WAF 210, in some cases. In some cases, the WAF 210 can rely on the classifier 224 for a genuine or anomalous classification. The classifier 224 can use the classification to handle subsequent requests received during the session based on the classification of the session as one of anomalous or genuine.

In some cases, the classifier 224 can instruct the WAF 210 to block subsequent requests or terminate the session responsive to a classification of anomalous. If the session is genuine, the classifier 224 can instruct the WAF 210 to allow the requests or process the requests to grant access to the web application provided by the server 208. Processing the requests can refer to or include forwarding the request to the server 208 or resource or service hosted or provided by the server 208.

As the session continues, the data processing system 202 can continue to receive the time series of security metrics, generate security features, aggregate the security features based on the sliding time window, and generate a new classification for the session. Based on the new classification, the data processing system 202 can determine to block or process the requests. The data processing system 202 can block the requests itself, or instruct the WAF 210 to block the requests if the WAF 210 is hosted by a separate component or device than the data processing system 202. Thus, a session initially classified as genuine can later be classified as anomalous.

Figure 3:
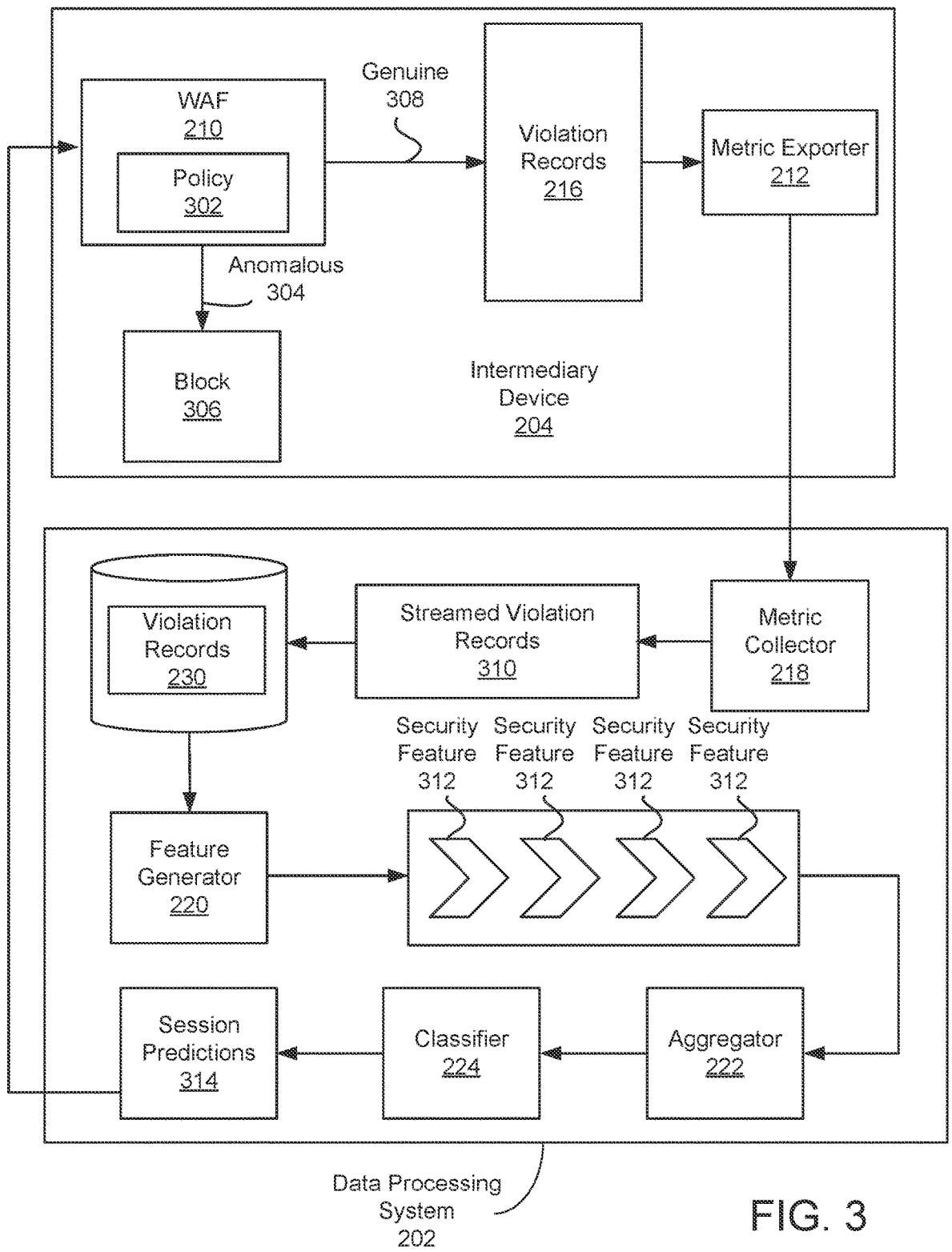
FIG. 3 depicts an example flow diagram illustrating the operation of a system that handles sessions between clients and servers based on session classifications, in accordance with an implementation.

FIG. 3 depicts an example flow diagram illustrating the operation of a system that handles sessions between clients and servers based on session classifications, in accordance with an implementation. The operational flow 300 can be performed by one or more component or system depicted in FIG. 1A, 1B or 2, including, for example, the data processing system 202 or intermediary device 204. The intermediary device 204 can include the WAF 210. The WAF 210 can apply a policy 302 to analyze the network traffic associated with a session established between a client and server to access a resource provided by the server. The policy 302 can include one or more rules or patterns that can be used to detect a violation. The WAF 210 can determine, using policy 302, that the session is anomalous at 304, and then proceed to blocking the session at 306. Blocking the session can refer to blocking subsequent requests from a client device that established the session. Blocking the requests can include terminating the session.

If, however, the WAF 210 determines that the session is genuine 308 using the policy 302, the WAF 210 can determine to process the request and forward the requests to a server. Further, if the WAF 210 determines the session is genuine at 308, the intermediary device 204 can generate violation records that include the time stamps and corresponding violations. The metric exporter 212 can stream these violation records to the data processing system 202 for further processing. In implementations, the intermediary device 204 can stream violation records to the data processing system 202 that the WAF 210 determined were genuine 308. By streaming to the data processing system 202 violation records deemed genuine using the policy 302 of the WAF 210, the data processing system 202 can catch false negatives using the classifier 224. Further, this allows for the policy 302 to be less strict or relaxed in some capacity so as not to reduce the likelihood of false positives generated by the WAF 210. While relaxing the policy 302 can result in false negatives, the data processing system 202 can detect the false negatives using the classifier 224, and then instruct the WAF 210 to block the session.

In implementations, the metric exporter 212 can stream the violation records 216 corresponding to both the genuine sessions or anomalous sessions as determined by the WAF 210 using the policy 302, thereby allowing the data processing system 202 to overrule an anomalous classification by the WAF 210. In implementations, the metric exporter 212 can stream the violation records 216 corresponding to only the genuine session so as to allow the data processing system 202 to catch false negatives, while reducing network bandwidth consumption and processor utilization by the data processing system 202.

The metric collector 218 can receive the violation records and stream the violation records 310 to a data repository (e.g., second data repository 226 depicted in FIG. 2) for storage as a violation records 230 data structure. The feature generator 220 can convert the streamed violation records containing a time series of network security metrics to security features 312. The data processing system 202 can provide the security features 312 to the aggregator 222. The aggregator 222 can apply a sliding time window to generate aggregated security features that combine the number of occurrences of violations for multiple time stamps. The classifier 224 receive and classify the aggregated security features for the sliding time window, and output a session prediction 314. The session prediction 314 can be anomalous or genuine. The data processing system 202 can provide the session prediction 314 to the WAF 210 of the intermediary device 204. The WAF 210, upon receiving the session prediction 314, can block or process the session accordingly. For example, if the session prediction 314 is anomalous, then the WAF 210 can block 306 the session. If the session prediction 314 is genuine, then the WAF 210 can process the session.

In implementations, the intermediary device 204 can transmit all violation records to the data processing system 202 for classification, and wait for the session prediction 314 prior to blocking or processing requests of the session. In implementations, the intermediary device 204 can block requests deemed anomalous by the policy 302, while forwarding violation records deemed genuine to the data processing system 202 for confirmation prior to processing the requests. In this configuration, the intermediary device 204 may not process any requests until the data processing system 202 also provides a session prediction 314 of genuine.

Figure 4:
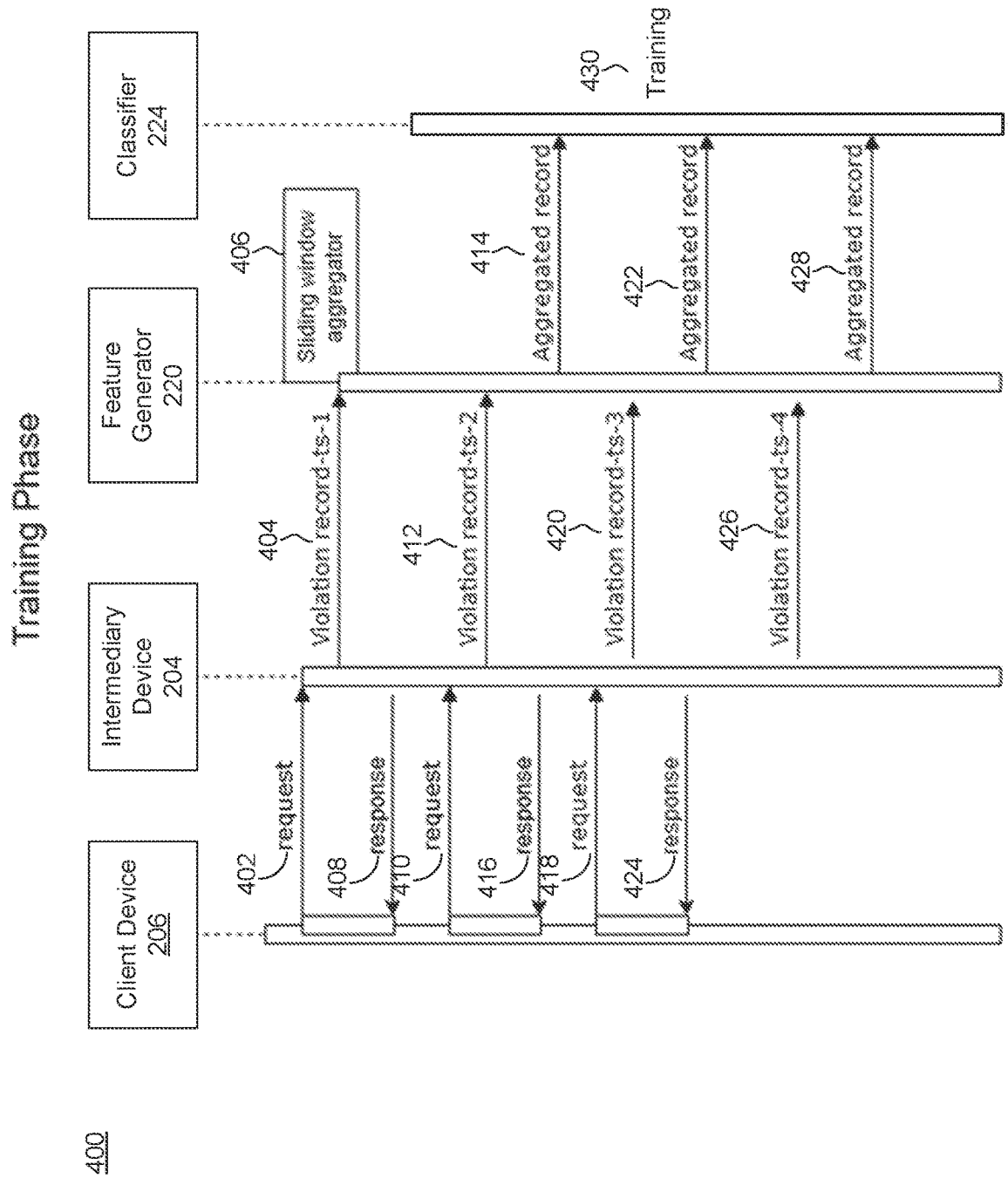
FIG. 4 depicts an example flow diagram illustrating training a system to handle sessions between clients and servers based on session classifications, in accordance with an implementation.

FIG. 4 depicts an example flow diagram illustrating training a system to handle sessions between clients and servers based on session classifications, in accordance with an implementation. The operation 400 can be performed by one or more component or system depicted in FIG. 1A, 1B, 2, or 3, including, for example, a data processing system, an intermediary device, a client device, and a server. The client device 206 can transmit request 402. Request 402 can be to access a web application or resource provided by a server. The request 402 can be to establish a session between the client device 206 and the server. The intermediary device 204 can receive the request 402. The intermediary device 204 can analyze the request using a WAF or WAF policy to generate a violation record 404 at timestamp 1. The intermediary device 204 can transmit the violation record 404 for timestamp 1 to the feature generator 220. The feature generator 220 can be a part of the data processing system

202 depicted in FIG. 2. The feature generator 220 can generate a security feature based on the violation record 404, which can include a time series of network security metrics corresponding to violations detected by the WAF of the intermediary device 204. The feature generator 220 can provide the security feature to a sliding window aggregator 406, which can aggregate the security features using a sliding time window. In some cases, the feature generator 220 may not provide the first security feature that only contains the initial request 402 or initial violation record 404 to the classifier 224. Rather, the feature generator 220 can wait until there are multiple security features to aggregate.

The intermediary device 204 can provide a response 408 to the client device 206 that is responsive to the request 402. The client device 206 can transmit a second request 410. The intermediary device 204 can receive the second request 410. The intermediary device 204 can analyze the second request 410 using a WAF policy and generate a second violation record 412 at time stamp 2. The feature generator 220 can receive the second violation record 412 and generate a second security feature and aggregate the security feature with the first security feature generated from the violation record 404 at the first time stamp. The feature generator 220 (or other component of the data processing system 202, such as the aggregator 222) can generate the aggregated security feature 414. The aggregated security feature 414 can be provided to the classifier 224 for training 430.

The intermediary device 204 can provide a second response 416 that is responsive to the second request 410. The client device 206 can transmit a second request 418. The intermediary device 204 can analyze the second request 418 using the WAF policy to generate a third violation record 420 at time stamp 3. The feature generator 220 can receive the third violation record 420, generate a third security feature, and generate a second aggregated record 422. The second aggregated record 422 can include one or more previous security features based on the size of the sliding time window. For example, the time window can be two time stamps, in which case the aggregated record 422 can correspond to violation record 412 and violation record 420, but not violation record 404. The time window can be three time stamps, in which case the aggregated record 422 can correspond to violation records 404, 412 and 420. The classifier 224 can train a model based on the aggregated record 422.

The intermediary device 204 can provide a response 424 to the request 418. The intermediary device 204 can generate a fourth violation record 426. The fourth violation record 426 can be at time stamp 4. The fourth violation record 426 can be responsive to a request that is subsequent to responsive 424. The fourth violation record 426 can indicate the lack of a request subsequent to the response 424, in which case the fourth violation record 426 can indicate zero occurrences of violations. The feature generator 220 can receive the fourth violation record 426, and generate a third aggregated record 428 based on the fourth violation record 426 and at least the third violation record 420. The classifier 224 can train 430 the model based on the third aggregated record 428.

Figure 5:
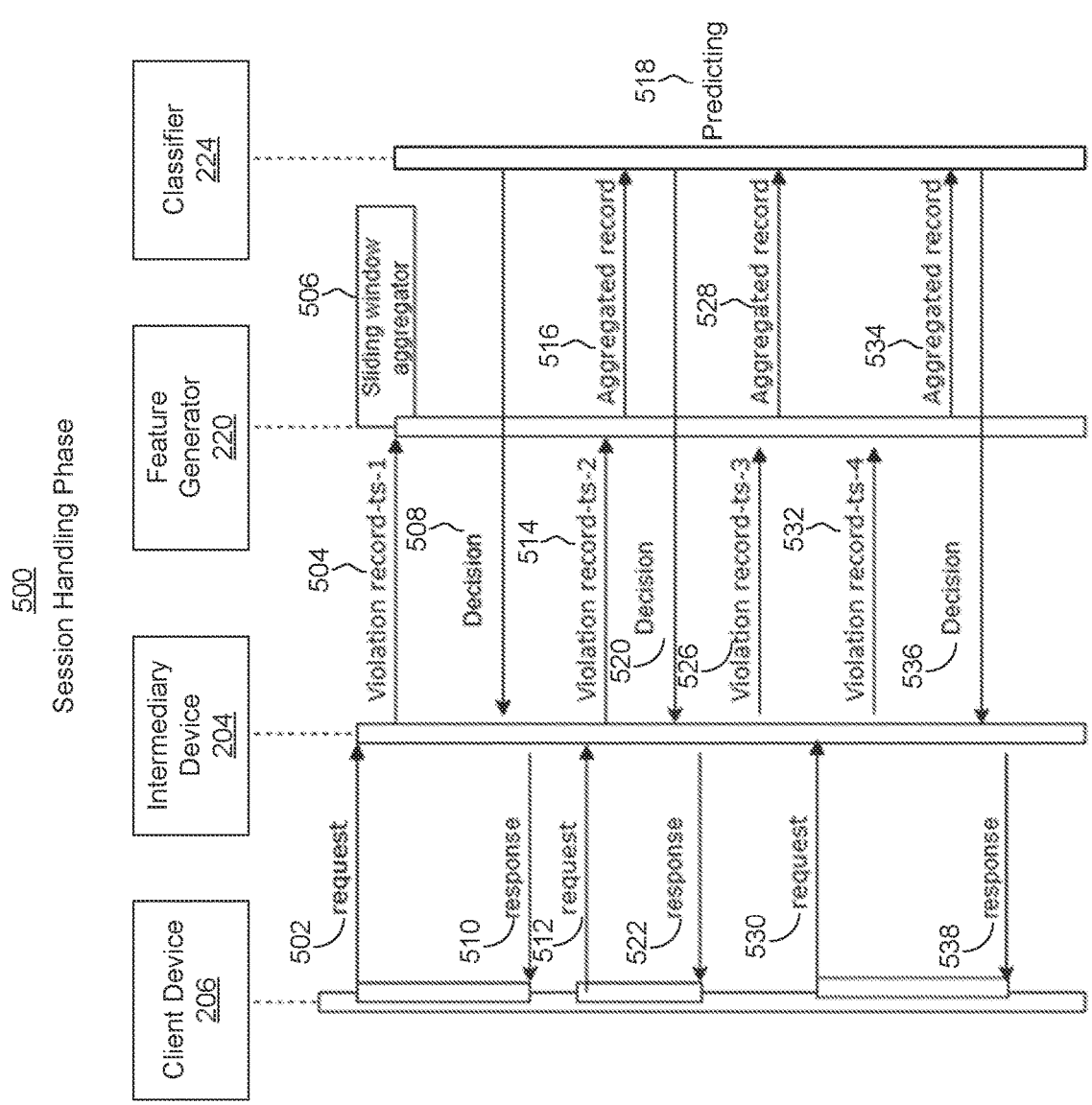
FIG. 5 depicts an example flow diagram illustrating the operation of a system that handles sessions between clients and servers based on session classifications, in accordance with an implementation.

FIG. 5 depicts an example flow diagram illustrating the operation of a system that handles sessions between clients and servers based on session classifications, in accordance with an implementation. The process 500 can be performed by one or more component or system depicted in FIG. 1A, 1B, 2, or 3, including, for example, a client device 206, intermediary device 204, feature generator 220, or a classifier 224. The process 500 can refer to the system classifying and handling a session after the machine learning model has been trained, for example as depicted in FIG. 4. The intermediary device 204 can receive a first request 502 from the client device 206. The first request 502 can be to access a web application, resource or service provided by a server. The intermediary device 204 can analyze the request to generate a violation record 504 at timestamp 1. The violation record 504 can indicate whether an occurrence of a violation has occurred, or the number of occurrences of one or more violations. The intermediary device 204 can transmit the violation record 504 to the feature generator 220. The feature generator 220 can generate a security feature based on the violation record 504. For example, the violation record 504 can include a time series of security metric indicating the detected violation. The feature generator 220 can provide the security feature to a sliding window aggregator 506. The classifier 504 can make a decision 508 based on the security feature generated from violation record 504. For example, the classifier 224 can input the security feature generated from violation record 504 into a model trained using a machine learning technique. The classifier 224 can output a decision 508, which can include a prediction as to whether the session is anomalous or genuine. In this case, the classifier 224 can determine the session is genuine and allow the intermediary device 204 to continue processing requests from the client device 206. The intermediary device 204 can transmit a response 510 to the client device 206 that is responsive to the request 502. The intermediary device 204 can generate the response 510 responsive to the classifier 224 providing the decision 508 indicating that the classification of the session is genuine.

The client device 206 can transmit a second request 512. The intermediary device 204 can receive the second request 512. The intermediary device 204 can analyze the second request 512 to generate a second violation record 514 at a second time stamp. The intermediary device 204 can transmit the second violation record 514 to the feature generator 220. The feature generator 220 can generate a second security feature based on the second violation record 514, and generate an aggregated record 516 that aggregates security features generated based on the first violation record 504 and the second violation record 514. The feature generator 220 can apply a sliding time window to aggregate the security features. The feature generator 220 can provide the aggregated record 516 to the classifier 224. The classifier 224 can input the aggregated record 516 into a model to output a session classification prediction. The classifier 224 can provide the decision 520 indicate whether the session is classified at anomalous or genuine. The classifier 224 can provide the decision 520 to the intermediary device 204 to handle the session.

The intermediary device 204, upon receiving the decision 520 from the classifier 224, can determine to allow the session to continue and generate a second response 522. The intermediary device can provide the second response 522 to the client device 206. The client device 206 can receive the second response 522. The intermediary device 204 can generate a third violation record 526 at a third time stamp. The third violation record 526 can be based on a characteristic of the session identified or detected by the intermediary device 204. For example, the third violation record 526 can be based on a pause or delay in requests from the client device 206. The feature generator 220 can receive the third violation record 526 and generate a second aggregated record 528, based on a sliding time window, and provide the second aggregated record 528 to the classifier 224 to predict 518 a session classification. The classifier 224 may not make any decision, or make a decision and forward the decision to the intermediary device 204.

The client device 206 can generate a third request 530. The intermediary device 204 can receive the third request 530 from the client device 206. The intermediary device 204 can analyze the third request 530 to generate a fourth violation record 523. The feature generator 220 can generate a security feature and the data processing system can aggregate the security feature based on the sliding time window to generate the third aggregated record 534. The classifier 224 can make a prediction based on the third aggregated record 534, and provide the decision 536 indicating the predicted classification to the intermediary device 204. The intermediary device 204 can determine to block or allow the request based on the decision 536. For example, the intermediary device 204 can determine to generate response 538 if the decision 536 was to allow the session based on a classification of genuine.

Figure 6:
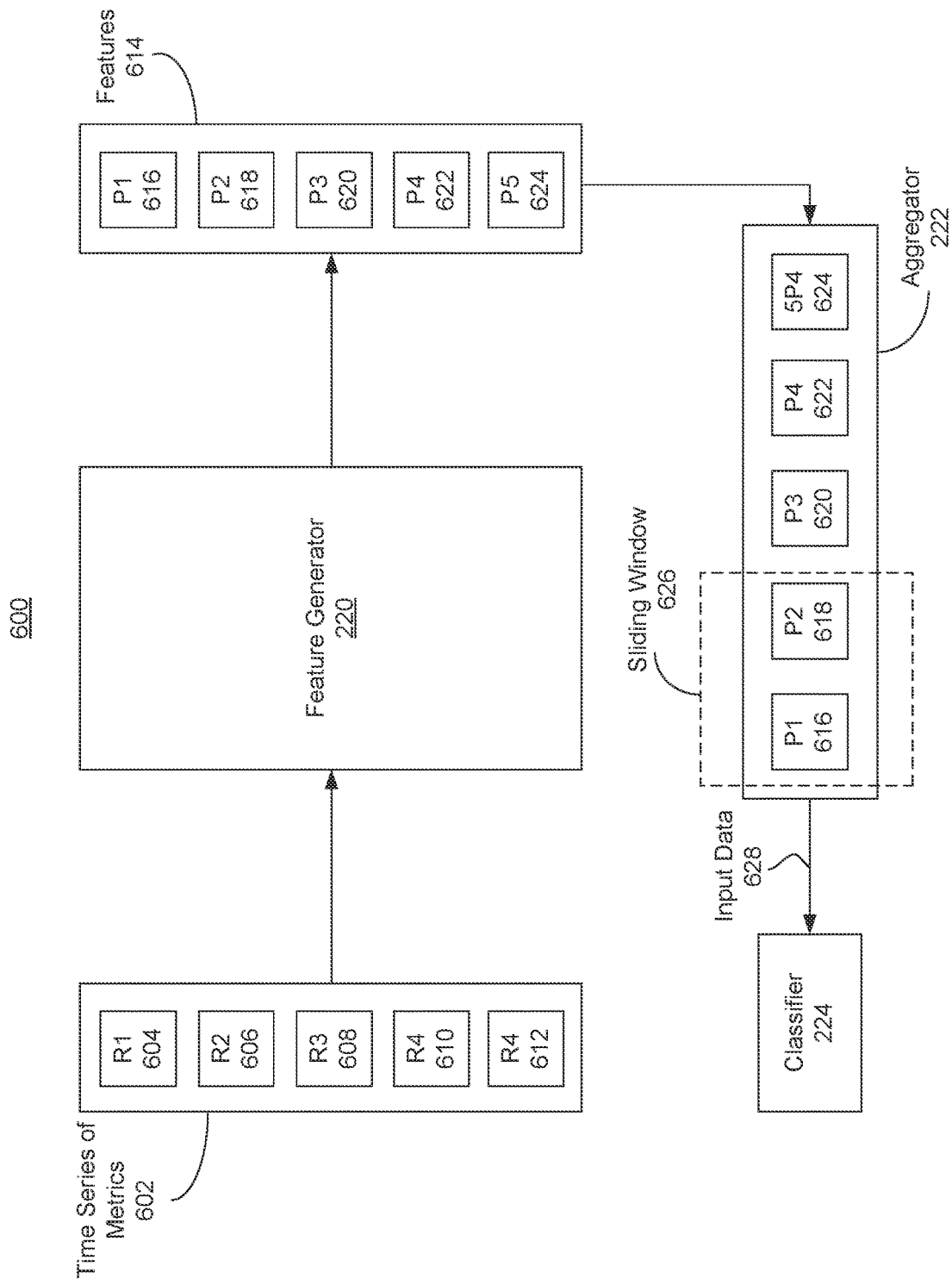
FIG. 6 depicts an example flow diagram illustrating the operation of components of a system that handles sessions between clients and servers based on session classifications, in accordance with an implementation.

FIG. 6 depicts an example flow diagram illustrating the operation of components of a system that handles sessions between clients and servers based on session classifications, in accordance with an implementation. The process 600 can be performed by one or more component or system depicted in FIG. 1A, 1B, 2, or 3, including, for example, a client device, server, intermediary device, or data processing system. A WAF can generate a time series of metrics 602 that can include violation records R1 604, R2 606, R3 608, R4, 608, R4 610, and R5, 612. The violation records 604-612 can correspond to a time series of metrics. For example, violation record R1 604 can be for a single type of violation and include a time series of occurrences of the violation. The violation record R2 606 can be for a single type of violation that is different than the type of violation of R1 604, and include a time series of occurrences of the second violation. The feature generator 220 can receive the time series of metrics 602 and convert the time series of metrics 602 into features 614. The features 614 can include a first feature P1 616, a second feature P2 618, a third feature P3 620, a fourth feature P4 622, and a fifth feature 624. Each of the features 616-624 can be for a single time stamp, but list all of the occurrences of the types of violation. Thus, the features 614 can be configured as a single time stamp, but listing multiple types of violations, whereas the time series of metrics record includes a single violation, but multiple times of occurrences.

The feature generator 220 can provide the features 614 to an aggregator 222. The aggregator 222 can apply a sliding window 626 to combine two or more features 614 based on the size of the time window. In this example, the size of the time window is 2, in which case the aggregator 222 combines the features P1 616 with P2 618 to generate input data 628. As the session continues, the aggregator 222 can move the time window to combine P2 618 with P3 620 to generate second input data 628. The aggregator 222 can provide the input data 628 to the classifier 224 to generate a session prediction. The classifier 224 can generate a prediction of genuine or anomalous, or other indication that the session is not malicious (or should continue) or the session is malicious (or should be blocked).

Figure 7:
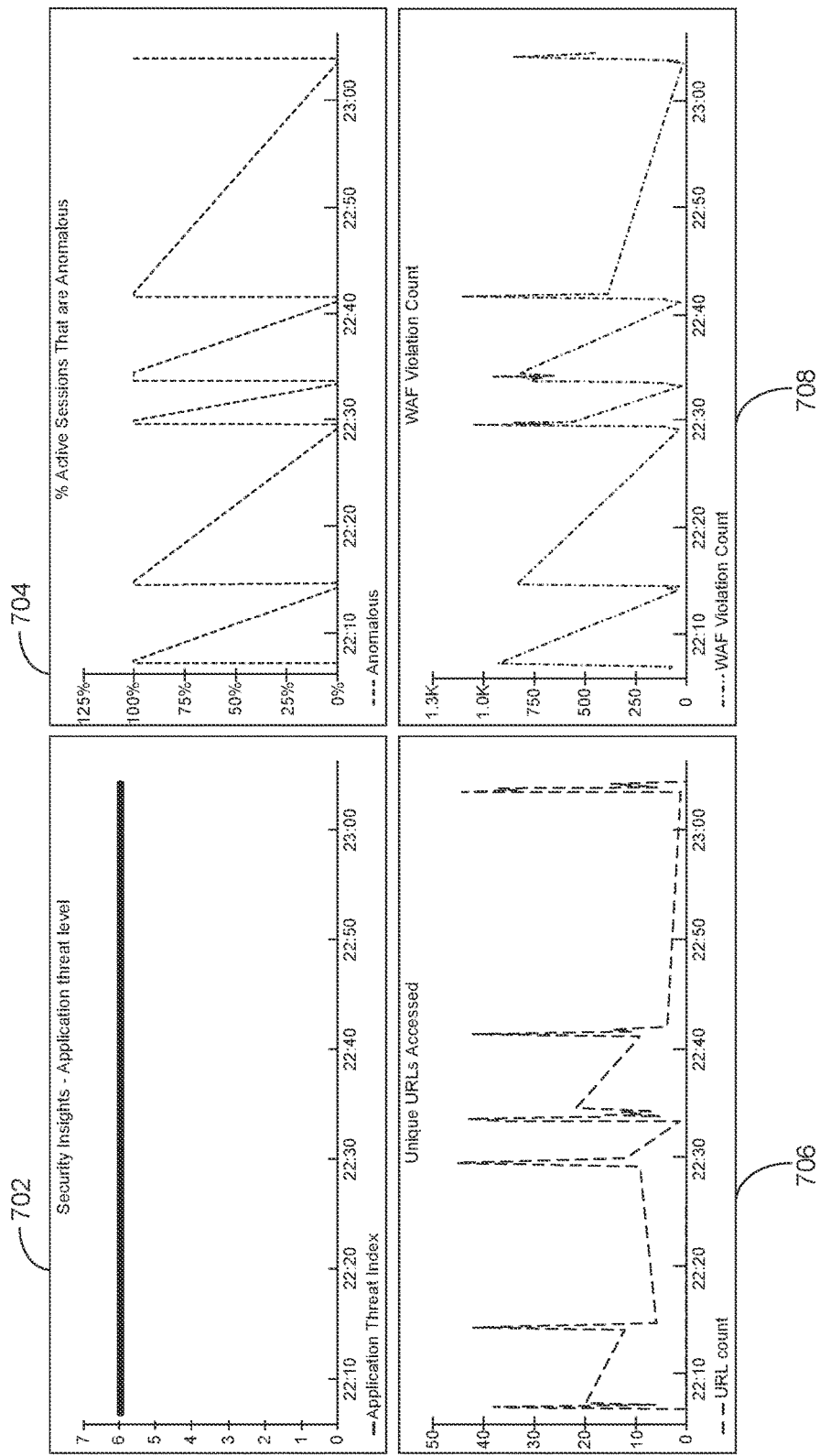
FIG. 7 depicts an example dashboard illustrating detecting classification predictions output by a system that handles sessions between clients and servers based on session classifications, in accordance with an implementation.

FIG. 7 depicts an example dashboard illustrating detecting classification predictions output by a system that handles sessions between clients and servers based on session classifications, in accordance with an implementation. The dashboard 700 can be generated by one or more component or system depicted in FIG. 1A, 1B, 2, or 3, including, for example, a data processing system or an intermediary device. The dashboard 700 can be for multiple sessions behind handled by an intermediary device and a data processing system. The dashboard 700 includes a first graph 702 indicating security insights that indication the application threat levels; a second graph 704 indicating the percentage of sessions at a given time that are anomalous; a third graph 706 indicating the number of unique URLs accessed via sessions handled by the intermediary device; and a fourth graph 708 with a WAF violation count generated by the intermediary device. The x-axis (or horizontal axis) for each of the graphs 702-708 indicate time stamps and are related to one another. The y-axis for graph 702 indicates the threat level of one or more applications being accessed, with 6 being the highest and 0 being the lowest threat. The y-axis of graph 704 indicates percentage of active sessions that are deemed anomalous. The remaining percentage is deemed genuine (e.g., if graph shows 75% of sessions are anomalous at 22:10, then 25% of active sessions are genuine at the same time). The y-axis of the graph 706 indicates the number of unique URLs accessed via the intermediary device at that time stamp. And the y-axis of the graph 708 indicates the number of WAF violation counts generated by the intermediary device at particular time. As indicated by the dashboard, the greater the number of unique URLs accessed the more likely the WAF violation count is higher, which results in the classifier classifying a larger percentage of sessions as anomalous.

Figure 8:
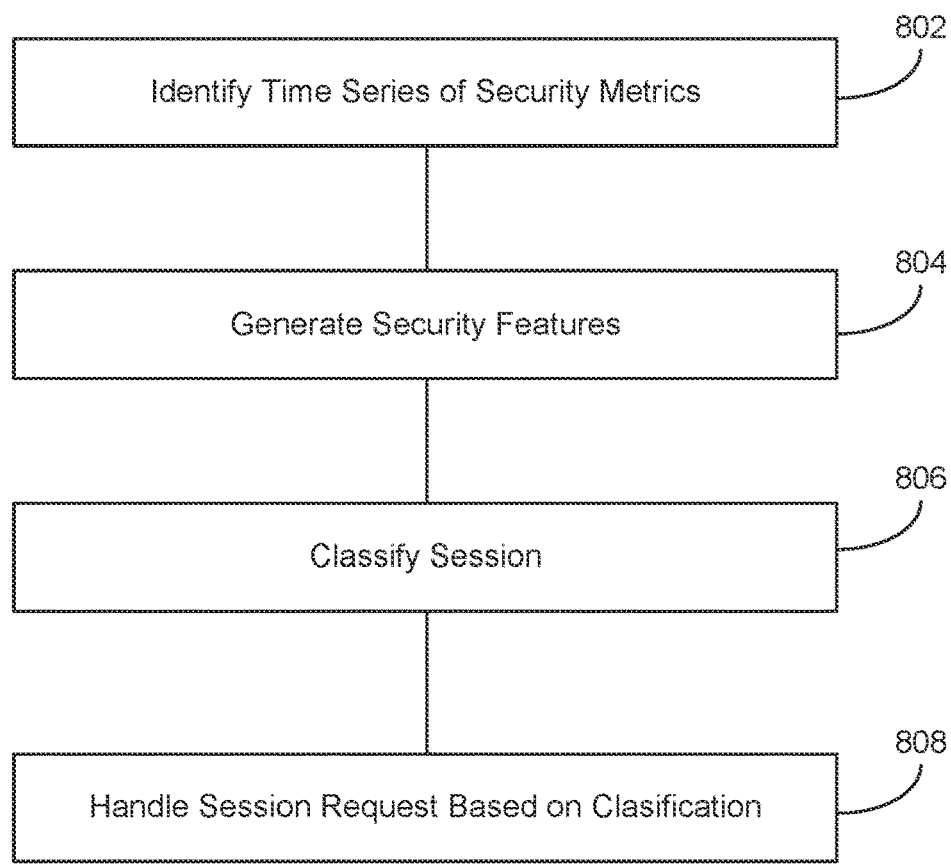
FIG. 8 depicts an example method for handling sessions between clients and servers based on session classifications, in accordance with an implementation.

FIG. 8 depicts an example method for handling sessions between clients and servers based on session classifications, in accordance with an implementation. The process 800 can be performed by one or more component or system depicted in FIG. 1A, 1B, 2, or 3, including, for example, a client device, server, intermediary device, or data processing system. At 802, a device (e.g., a data processing system) can identify a time series of security metrics. The device can receive the time series of security metrics from a WAF. At 804, the device can generate security features based on the time series of security metrics. The security features can be for a single time stamp, and indicate the number of occurrences of particular violations at that time stamp. At 806, the device can input the security features into a model to output a session classification prediction. The device can apply a sliding time window to aggregate two or more security features, and input the aggregated security features into the model to generate the session classification. The device can handle a current session request or one or more subsequent session requests based on the classification. For example, the device can allow or authorize the processing of the current request from the client device based on the classification. When the device receives a subsequent request, the device can reclassify the request to determine whether to process or block the request.

The above-mentioned elements or entities may be implemented in hardware, or a combination of hardware and software, in one or more embodiments. Components may be implemented using hardware or a combination of hardware or software detailed above in connection with FIGS. 1A-1B. For instance, these elements or entities can include any application, program, library, script, task, service, process or any type and form of executable instructions executing on hardware of a device. The hardware includes circuitry such as one or more processors in one or more embodiments.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

It will be further understood that various changes in the details, materials, and arrangements of the parts that have been described and illustrated herein may be made by those skilled in the art without departing from the scope of the following claims.

What is claimed is:

1. A method of handling sessions between client devices and one or more server based on session classifications, comprising:
    identifying, by a device comprising one or more processors and memory, a time series of security metrics corresponding to one or more requests received during a session established by a client device to access a resource provided by one or more servers;
    generating, by the device, a plurality of security features from the time series of security metrics based on one or more time windows;
    training a classifier to classify the session as the one of anomalous or genuine by:
        receiving, for a predetermined classification, a plurality of training violation records with time stamps that occurred during a time interval of a training session,
        converting the plurality of training violation records to a training time series of security metrics,
        generating training security features based on the training time series of security metrics, the training security features indicating a number of occurrences of a security metric during the time interval, and
        training the classifier with the training security features with an indication of the predetermined classification to cause the classifier to classify the session as the one of anomalous or genuine based on the plurality of security features;
    classifying, by the device via the classifier, the session as one of anomalous or genuine using the plurality of security features generated from the time series of security metrics based on the one or more time windows; and
    handling, by the device, a request received during the session based on the classification of the session as the one of anomalous or genuine.

2. The method of claim 1, comprising:
    identifying, by the device, a plurality of violation records corresponding to the one or more requests received during the session; and
    determining, by the device, the time series of security metrics based on the plurality of violation records.

3. The method of claim 1, comprising:
    generating, by the device, a plurality of violation records based on detecting one or more security violations associated with the one or more requests received from the client device during the session; and
    determining, by the device, the time series of security metrics based on the plurality of violation records.

4. The method of claim 1, comprising:
    generating, by the device, a session identifier for the session; and
    associating, by the device, a plurality of violation records based on the one or more requests with the session identifier.

5. The method of claim 1, comprising:
    blocking, by the device responsive to the session being anomalous, the request received from the client device during the session.

6. The method of claim 1, comprising:
processing, by the device responsive to the session being genuine, the request received from the client device during the session.

7. The method of claim 1, comprising:
generating, by the device, a second plurality of security features for a second one or more time windows of the session;
classifying, by the device, the session as one of anomalous or genuine using the second plurality of features based on the second one or more time windows; and
processing or blocking, by the device, subsequent requests received during the session based on the classification of the session as the one of anomalous or genuine based on the second one or more time windows.

8. The method of claim 1, comprising:
determining, by the device, the session is genuine based on the plurality of security features for the one or more time windows;
processing, by the device responsive to the session being genuine, the request received from the client device during the session;
generating, by the device, a second plurality of security features for a second one or more time windows of the session subsequent to the one or more time windows;
classifying, by the device, the session as anomalous using the second plurality of security features for the second one or more time windows; and
terminating, by the device, the session responsive to the classification of the session as anomalous based on the second plurality of security features.

9. The method of claim 1, comprising:
determining, by the device, a number of occurrences of each security metric of the time series of security metrics, wherein the security metric comprises at least one of cross site scripting, structured query language ("SQL") injection, broken authentication, form validations, malicious file uploads, security misconfigurations, component with a vulnerability, or sensitive data exposure; and
generating, by the device, the plurality of security features based on the number of occurrences of each security metric of the time series of security metrics.

10. A system to handle sessions between client devices and one or more server based on session classifications, comprising:
a device comprising one or more processors and memory to:
identify a time series of security metrics corresponding to one or more requests received during a session established by a client device to access a resource provided by one or more servers;
generate a plurality of security features from the time series of security metrics based on one or more time windows;
train a classifier to classify the session as the one of anomalous or genuine by:
receiving, for a predetermined classification, a plurality of training violation records with time stamps that occurred during a time interval of a training session,
converting the plurality of training violation records to a training time series of security metrics,
generating training security features based on the training time series of security metrics, the training security features indicating a number of occurrences of a security metric during the time interval, and
training the classifier with the training security features with an indication of the predetermined classification to cause the classifier to classify the session as the one of anomalous or genuine based on the plurality of security features;
classify the session as one of anomalous or genuine using the plurality of security features generated from the time series of security metrics based on the one or more time windows; and
handle a request received during the session based on the classification of the session as the one of anomalous or genuine.

11. The system of claim 10, wherein the device is further configured to:
identify a plurality of violation records corresponding to the one or more requests received during the session; and
determine the time series of security metrics based on the plurality of violation records.

12. The system of claim 10, wherein the device is further configured to:
generate a session identifier for the session; and
associate a plurality of violation records based on the requests with the session identifier.

13. The system of claim 10, wherein the device is further configured to:
block, responsive to the session being anomalous, the request received from the client device during the session.

14. The system of claim 10, wherein the device is further configured to:
generate a second plurality of security features for a second one or more time windows of the session;
classify the session as one of anomalous or genuine using the second plurality of features based on the second one or more time windows; and
process or block subsequent requests received during the session based on the classification of the session as the one of anomalous or genuine based on the second one or more time windows.

15. The system of claim 10, wherein the device is further configured to:
determine the session is genuine based on the plurality of security features for the one or more time windows;
process, responsive to the session being genuine, the request received from the client device during the session;
generate a second plurality of security features for a second one or more time windows of the session subsequent to the one or more time windows;
classify the session as anomalous using the second plurality of security features for the second one or more time windows; and
terminate the session responsive to the classification of the session as anomalous based on the second plurality of security features.

16. The system of claim 10, wherein the device is further configured to:
determine a number of occurrences of each security metric of the time series of security metrics, wherein the security metric comprises at least one of cross site scripting, structured query language ("SQL") injection, broken authentication, form validations, malicious file uploads, security misconfigurations, component with a vulnerability, or sensitive data exposure; and generate the plurality of security features based on the number of occurrences of each security metric of the time series of security metrics.

17. A non-transitory computer-readable medium storing instructions that, when executed by one or more processors, cause the one or more processors to:

receive a plurality of historical violation records with time stamps that occurred during a time interval of a training session;

convert the plurality of historical violation records to a training time series of security metrics;

generate training security features based on the training time series of security metrics, the training security features indicating a number of occurrences of a security metric during the time interval;

train a classifier with the training security features with an indication of a predetermined classification to cause the classifier to output session classifications based on inputted security features;

provide the classifier to a device that receives requests from a client device that established a session with a server to cause the device to use the classifier to classify the session as anomalous based on a time series of security metrics generated for the requests that occurred during a time window within the session; and update the classifier based on an indication of excessive false positives or false negatives with second training security features and the indication of the predetermined classification.

* * * * *